United States Patent [19]
Ishikawa et al.

[11] Patent Number: 5,321,432
[45] Date of Patent: Jun. 14, 1994

[54] IMAGE FORMING APPARATUS WITH RESOLUTION CONTROL

[75] Inventors: Yasushi Ishikawa; Fumio Tomono, both of Tokyo, Japan

[73] Assignee: Seikosha Co., Ltd., Tokyo, Japan

[21] Appl. No.: 853,365

[22] Filed: Mar. 18, 1992

[30] Foreign Application Priority Data

Mar. 20, 1991 [JP] Japan .................................. 3-56739

[51] Int. Cl.$^5$ ........................... A04N 1/21; E41J 2/435
[52] U.S. Cl. .................................. 346/108; 358/298; 346/160
[58] Field of Search .................. 346/1.1, 76 L, 107 R, 346/108, 160; 358/296, 298, 300, 302

[56] References Cited

U.S. PATENT DOCUMENTS

| | | | |
|---|---|---|---|
| 4,816,924 | 3/1989 | Sekiya | 358/296 |
| 5,124,802 | 6/1992 | Ito et al. | 358/298 |

*Primary Examiner*—Mark J. Reinhart
*Attorney, Agent, or Firm*—Jordan and Hamburg

[57] ABSTRACT

An image forming apparatus which enables resolution modes to be readily changed over has a light-emitting element for irradiating a polygonal mirror with a light beam and a controller for controlling the light-emitting element. The controller is connected to an image clock signal changeover circuit that changes the period of an image clock signal to a period which is n (a positive integer) times the former. The controller is arranged such that the image recording density in the horizontal scanning direction can be changed by the image clock signal changeover circuit and/or the controller judges the pulses of a horizontal synchronizing signal output from a photosensor to be valid at intervals of (n−1) pulses, thereby enabling control of the recording density in the vertical scanning direction. An electrostatic latent image with the desired recording density can be obtained on a photosensitive member by selecting a combination of an image recording density changeover operation for the horizontal scanning direction in which the period of the image clock signal is multiplied by n and an image recording density changeover operation for the vertical scanning direction in which the pulses of the horizontal synchronizing signal are judged to be valid at intervals of (n−1) pulses.

4 Claims, 3 Drawing Sheets

IMAGE FORMING APPARATUS WITH RESOLUTION CONTROL

BACKGROUND OF THE INVENTION

1. Field of the Invention

The present invention relates to an image forming apparatus, for example, a laser printer.

2. Description of Prior Art

Recently, the use of optical printers that employ a laser beam of a light-emitting element, e.g., LED, has been spreading. As recording densities of images output by these printers, 240, 300, 400, 480 and 600 dpi (dots/inch) are available in general. These image recording densities are used exclusively for each type of printer and for each printing purpose. However, since it is inconvenient and uneconomical that only one kind of recording density can be obtained with a single printer, there has been a demand for a printer which provides a plurality of recording densities. To meet the demand, printers having two or more recording densities which can be changed for each particular use have recently been developed. One example of this type of printer has control means for changing the laser beam diameter, the synchronizing frequency, the number of revolutions of a polygonal mirror and the developing bias, and enables these factors to be changed by a control operation conducted from an engine control board (see Japanese Patent Laid-Open (KOKAI) No. 01-264850, 1989). Another example of the above-described printers has a plurality of laser sources, and is arranged such that, in response to change-over of recording densities from one to another, the number of revolutions of a polygonal mirror is changed in a relatively low speed range and also the number of laser sources is changed, thereby minimizing the number of revolutions of the polygonal mirror, and thus avoiding difficulties in design that accompany the high speed rotation of the polygonal mirror (see Japanese Patent Laid-Open (KOKAI) No. 01-299042, 1989).

The first example of the prior art has the disadvantage, however, that the control means for changing over image recording densities is complicated, resulting in an increase in the cost. The second example also has the disadvantage that it is necessary not only to change the number of revolutions of the polygonal mirror but also to employ a plurality of light sources. Consequently, the control means is more complicated, resulting in an increase in the cost. In each of the prior art devices, it is necessary, in order to obtain high-density printing to increase the revolution rate of the polygonal mirror, so that it is impossible to avoid fluctuation of the resulting image and it is hence difficult to obtain an image of high quality.

SUMMARY OF THE INVENTION

In view of the above-described disadvantages of known devices, it is an object of the present invention to provide an image forming apparatus of low cost which is designed so that a plurality of image recording densities can be changed as desired in a single system simply by changing over resolution modes from one to another, and images of high quality can be obtained with ease.

To attain the above-described object, the present invention provides an image forming apparatus which forms an electrostatic latent image on a photosensitive member by irradiation with a light beam, comprising means for scanning the photosensitive member with a light beam emitted from light irradiation means in the horizontal scanning direction. A light detection means is disposed at one side of the photosensitive member to output a horizontal synchronizing signal with a predetermined period when detecting the light beam that crosses it. Means are provided for selecting two image clock signals having different periods for an ordinary resolution mode and a high resolution mode, respectively, and means are provided for controlling the operation of the light irradiation means on the basis of the horizontal synchronizing signal and the image clock signal output from the image clock signal changeover means. The image clock signal changeover means sets the period of the image clock signal in the ordinary resolution mode to n (n is a positive integer) times that in the high resolution mode, and/or the control means judges pulses of the horizontal synchronizing signal to be valid at intervals of (n−1) pulses in the ordinary resolution mode.

In the high resolution mode, a resolution signal that is applied to both the changeover means and the control means is set to H level so that the control means judges all pulses of the horizontal synchronizing signal input from the light detection means to be valid. When printing is started in this state, the light beam emitted from the light irradiation means is reflected via the scanning means so as to enter the light detection means before forming an image on the photosensitive member. Thus, the irradiation with the light beam from the light irradiation means is detected.

The light detection means that detects the light beam outputs a horizontal synchronizing signal to the control means. In response to the horizontal synchronizing signal, the control means outputs image data to the light irradiation means in synchronism with the image clock signal output from the image clock signal changeover means. In this way, the control means controls the light irradiation means to emit a light beam, thereby forming an electrostatic latent image on the photosensitive member with an image recording density for high resolution.

In the ordinary resolution mode, the resolution signal that is applied to the image clock signal changeover means is set to L level so that the period of the image clock signal is n times that in the high resolution mode, and/or the system is set so that the control means judges pulses of the horizontal synchronizing signal input from the light detection means to be valid (at intervals of n−1) pulses). When the apparatus is started in this state, the image recording density in the horizontal or vertical scanning direction is changed to 1/n times as large as that in the high resolution mode, thereby forming an electrostatic latent image with an image recording density for the ordinary resolution mode. If the system is set so that the control means judges all pulses of the horizontal synchronizing signal to be valid in the ordinary resolution mode, it is possible to obtain an image in which the density only in the horizontal scanning direction is 1/n times as large as that in the high resolution mode, while the density in the vertical scanning direction is the same as that in the high resolution mode.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

One embodiment of the image forming apparatus according to the present invention will be described below in detail with references to the accompanying drawings.

Figure 1:
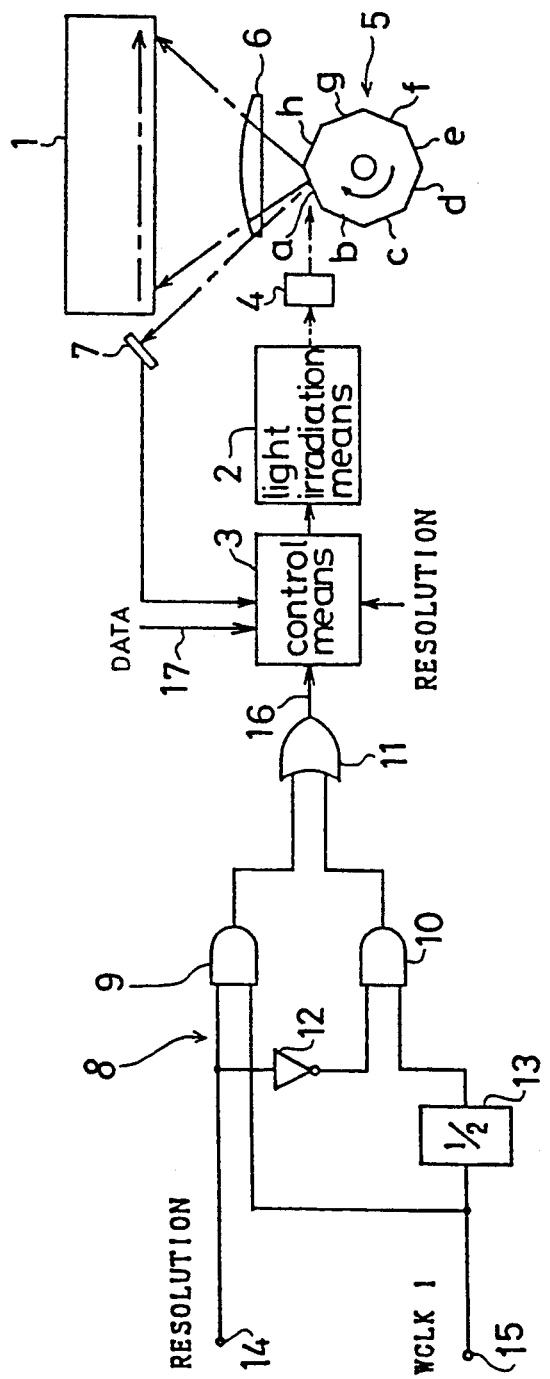
FIG. 1 is a block diagram showing schematically one embodiment of the image forming apparatus according to the present invention.

Referring to FIG. 1, the image forming apparatus of the present invention comprises a light irradiation means 2 that scans a photosensitive member 1, a control means 3 that controls the light irradiation means 2, and a image clock signal changeover means 8 that changes the period of an image clock signal.

The photosensitive member 1 comprises a photosensitive drum, which is rotatable about a horizontal axis by a photosensitive drum motor. A charger, a developing device, a cleaner and other equipment, which are not shown, are disposed around the drum constituting the photosensitive member 1.

The light irradiation means 2 employs a laser diode as a light-emitting element, which is capable of emitting a laser beam in response to a control signal delivered from the control means 3. A cylindrical lens 4 serving as an imaging lens is provided in front of the light irradiation means 2 so that the laser beam emitted from the light irradiation means 2 can be incident on a reflection surface of a polygonal mirror that serves as a scanning means 5.

The polygonal mirror 5 is provided in front of the photosensitive member 1 (i.e., below the photosensitive member 1 as viewed in the figure). The polygonal mirror 5 is rotatable clockwise at a predetermined number of revolutions per minute by a polygonal mirror motor (not shown). The laser beam that is incident on the rotating polygonal mirror 5 from the cylindrical lens 4 is reflected sequentially from reflection surfaces a, b, c . . . of the polygonal mirror 5, and the reflected beam moves from the left to the right as the polygonal mirror 5 rotates, thereby scanning the photosensitive member 1 to form an electrostatic latent image thereon. An imaging lens 6 is provided in the path of the reflected beam from the polygonal mirror 5 so that the reflected beam can be focused on the photosensitive member 1 through the imaging lens 6.

A light detection means 7 having a photosensor is provided at one side (the left-hand side) of the photosensitive member 1 so that the light detection means 7 can detect the reflected beam from the polygonal mirror 5 a little before the moving reflected beam reaches the photosensitive member 1. The light detection means 7 outputs a horizontal synchronizing signal HSYNC to the control means 3 each time it detects the reflected beam.

Figure 5:
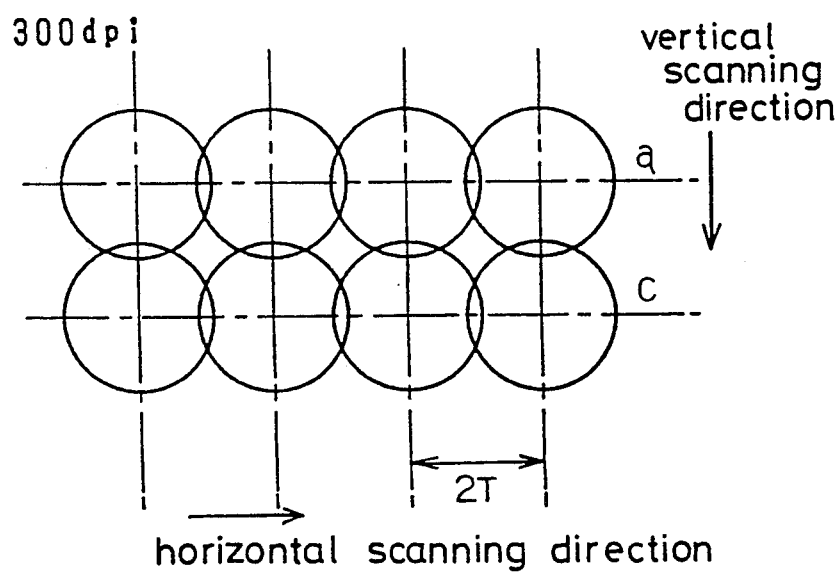
FIG. 5 shows the manner in which an electrostatic latent image is formed in the ordinary resolution mode.

The control means 3 comprises a central processing unit, which receives a detection signal from the light detection means 7 and a resolution signal RESOLUTION input from a control board (not shown). In addition, the central processing unit receives an image clock signal with a predetermined period (T) from the image clock signal changeover means 8. In the high resolution mode, the control means 3 reads image data each time a pulse of the horizontal synchronizing signal HSYNC is input thereto, and it controls the light irradiation means 2 on the basis of the image data. In the ordinary resolution mode, the period of the image clock signal is changed to n (n is a positive integer) times that in the high resolution mode, and the control means 3 judges pulses of the horizontal synchronizing signal HSYNC to be valid at intervals of (n−1) pulses. Accordingly, in the ordinary resolution mode, the control means 3 reads and outputs image data to the light irradiation means 2 at intervals of (n−1) pulses of the horizontal synchronizing signal HSYNC. The formation of an electrostatic latent image on the photosensitive member 1 is thus effected at intervals of (n−1) lines, and the image recording density in the vertical scanning direction is 1/n times as large as that in the high resolution mode, as shown in FIG. 5.

As shown in the left-hand part of FIG. 1, the image clock signal changeover means 8 comprises a combination of two AND circuits 9 and 10, an OR circuit 11, an inverter 12 and a frequency divider 13. One input terminal 14 of the image clock signal changeover means 8 receives the resolution signal RESOLUTION, while the other input terminal 15 receives an image clock signal WCLK1 with a pulse period T for the high resolution mode (see FIG. 2). The frequency divider 13 converts the image clock signal WCLK1 with the period T for the high resolution mode into an image clock signal WCLK2 for the ordinary resolution mode which comprises pulses with a period double the period T, i.e., 2T, (see FIG. 3) and outputs it to the AND circuit 10. In the image clock signal changeover means 8, if the resolution signal RESOLUTION is set to H level, the image clock signal WCLK1 from the AND circuit 9 is output from an output terminal 16, whereas, if the signal RESOLUTION is changed to L level, the image clock signal changeover means 8 outputs the image clock signal WCLK2 from the AND circuit 10 that has the period 2T, that is, a pulse rate which is half that of the image clock signal WCLK1 for the high resolution mode.

The following is a description of the operation of the embodiment of the present invention when the image recording density in the high resolution mode is 600 dpi and that in the ordinary resolution mode is 300 dpi.

Figure 2:
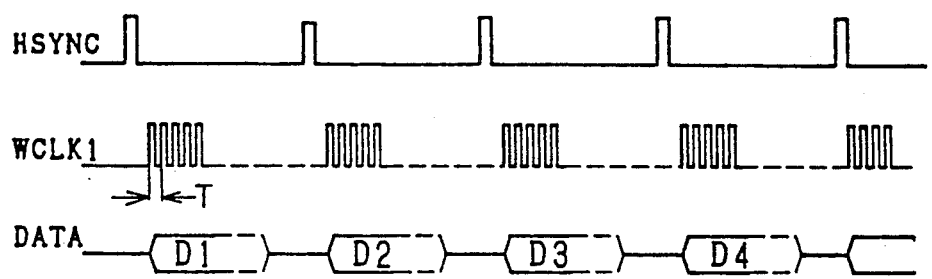
FIG. 2 is a time chart showing the relationship between the horizontal synchronizing signal and the data output timing in the high resolution mode.
Figure 4:
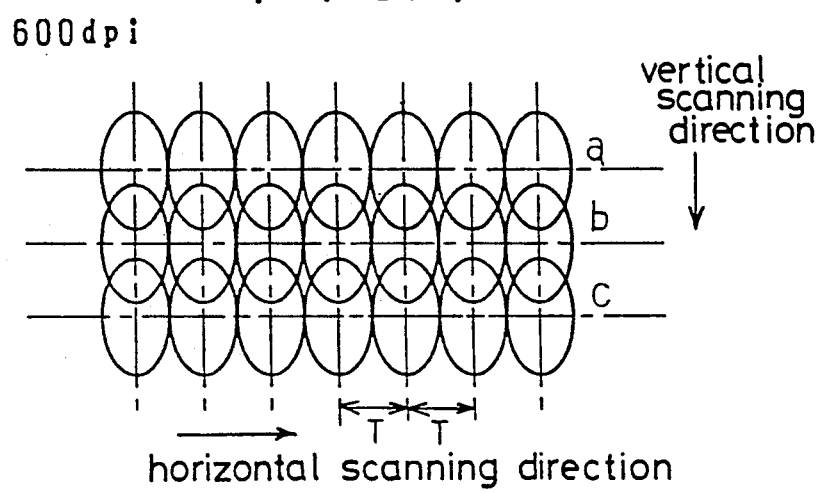
FIG. 4 shows the manner in which an electrostatic latent image is formed in the high resolution mode.

In the high resolution mode in which the image recording density is 600 dpi, the resolution signal RESOLUTION that is applied to both the image clock signal changeover means 8 and the control means 3 is set to H level. In consequence, the image clock signal WCLK1 with the period T is output to the control means 3 from the output terminal 16. In addition, the control means 3 judges all pulses of the horizontal synchronizing signal to be valid, as will be described later. The laser beam from the light irradiation means 2 is passed through the cylindrical lens 4 so as to be incident on the right-hand end of the reflection surface a at the upper end of the octahedral polygonal mirror 5 rotating at high speed. Since the polygonal mirror 5 rotates clockwise, the incident laser beam moves from the right to the left relative to the reflection surface a and, while doing so, it is reflected therefrom while changing the angle of reflection. The reflected laser beam is focused on the photosensitive member 1 through the imaging leans 4 after the light detection means 7 detects the reflected beam from the surface a of the polygonal mirror 5. Upon detecting the reflected beam from the reflection surface a, the light detection means 7 outputs a horizontal synchronizing signal HSYNC to the control means 3 to determine a write position on the photosensitive member 1. In response to the horizontal synchronizing signal HSYNC, the control means 3 receives the image clock signal WCLK1 from the changeover means 8 and reads image data D1 from the input line 17. The read data D1 is output as image date from the control means 3 to the light-emitting element 2 serving as the light irradiation means in synchronism with the image clock signal WCLK1, and the light-emitting element 2 effects irradiation with the laser beam on the basis of the image data. The relationship between the horizontal synchronizing signal HSYNC, the image clock signal WCLK1 and the output of the data D1 is shown in FIG. 2. The laser beam incident on the reflection surface a of the polygonal mirror 5 is reflected therefrom with the angle of reflection changed with the rotation of the polygonal mirror 5 and focused on the photosensitive member 1 from the left to the right through the imaging lens 6, thus scanning the photosensitive member 1 in the horizontal scanning direction shown by the one-dot chain line arrow. As a result of this scanning, an electrostatic latent image based on the data D1 for 1 line reflected from the surface a is formed on the photosensitive member 1, as shown in FIG. 4. Upon completion of the scanning by the reflection surface a of the polygonal mirror 5, the laser beam is then applied to the subsequent reflection surface b, and an electrostatic latent image based on the subsequent data D2 is similarly formed on the photosensitive member 1. When the scanning by the reflection surface b is to be effected, the light-receiving surface of the photosensitive member 1 has already moved. Therefore, the scanning with the data D2 forms an electrostatic latent image at a position which shifts from the previous position for 1 line in the vertical scanning direction (i.e., downward as viewed in the figure), as shown in FIG. 4. Thereafter, the scanning in the horizontal scanning direction is repeated for each line in the vertical scanning direction by sequentially using the reflection surfaces c, d, e..., thereby forming electrostatic latent images based on data (D3 and those following it).

Figure 3:
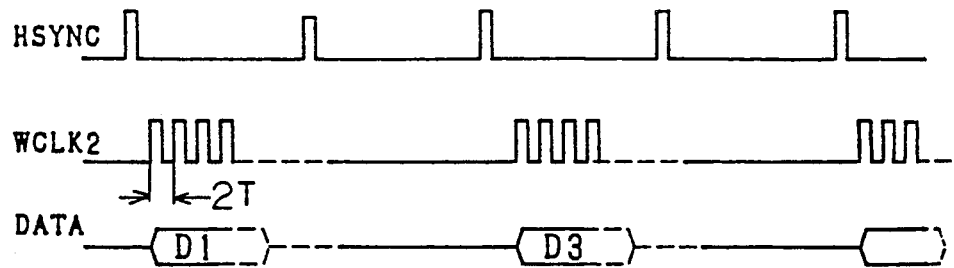
FIG. 3 is a time chart showing the relationship between the horizontal synchronizing signal and the data output timing in the ordinary resolution mode.

In the ordinary resolution mode in which the image recording density is 300 dpi, the resolution signal RESOLUTION that is applied to both the image clock signal changeover means 8 and the control means 3 is changed to L level. As a result of this changeover operation, the control means 3 is set for n=2, so that the image clock signal WCLK2 with the period 2T (i.e., the pulse rate is half that in the high resolution mode) is output from the output terminal 16 to the control means 3. As a consequence, the output of image data from the control means 3 to the light-emitting element 2 is effected at a period double that in the high resolution mode, as shown in FIG. 3, so that the quantity of light irradiation for 1 line is half that in the high resolution mode. As a result, an electrostatic latent image based on data D1 for 1 line is formed on the photosensitive member 1 at a density of 300 dpi. Upon completion of the scanning for 1 line in the horizontal scanning direction by the reflection surface a of the polygonal mirror 5, the laser beam is then incident on the reflection surface b of the polygonal mirror 5, and the light detection means 7 detects the reflected beam and outputs a horizontal synchronizing signal HSYNC to the control means 3 in the same way as in the case of the reflection surface a. Since n is set to be 2, that is, the control means 3 has been set so as to judge the horizontal synchronizing signal to be valid at intervals of one pulse, as long as the imaging lens 4 faces the reflection surface b, non image data is output from the control means 3 to the light-emitting element 2, so that scanning for the second line on the photosensitive member 1 is not carried out. When the laser beam is incident on the reflection surface c subsequently, reading of the image data is carried out. Thus, the scanning in the vertical scanning direction is effected with 1 line skipped, and an electrostatic latent image based on data D3 is formed on the photosensitive member 1, as shown in FIG. 5.

With the rotational movement of the photosensitive member 1, the electrostatic latent image formed on the photosensitive member 1 as described above passes the position where the developing device (not shown) is provided, and at this time, the electrostatic latent image attracts toner for development to form a toner image, which is then transferred to a recording sheet of paper fed in a transfer device (not shown). The recording paper having the toner image transferred thereto is discharged from the printer by a feed roller (not shown).

In the ordinary resolution mode, the number of electrostatic latent images formed per unit area is a quarter of that in the high resolution mode, but there is no danger that the resulting image will be coarse because it is possible to make up for a deficiency in the number of electrostatic latent images by increasing the power of the laser diode serving as the light-emitting element so as to increase the area where each electrostatic latent image is formed, as shown in FIG. 5, and it is also possible to adjust the image quality by changing the developing bias.

Although in the foregoing embodiment the image recording density in the horizontal scanning direction is changed by doubling the period of the image clock signal (i.e., n=2), it should be noted that the present invention is not necessarily limited to n=2, and that n may be set to any desired positive integer, e.g., n=3, n=4, etc., to obtain the desired image recording density. Similarly, the recording density in the vertical scanning direction can be set to 1 times of (positive integer) as large as that in the high resolution mode to obtain the desired density. In addition, although in the foregoing embodiment the image recording density is changed for both the horizontal and vertical scanning directions, it is possible to change the resolution mode only for the horizontal or vertical scanning direction according to each particular printing purpose. In addition, although in the foregoing embodiment the image recording densities are 600 dpi and 300 dpi, it is also possible to employ a combination of 480 dpi and 240 dpi or a combination of 600 dpi, 300 dpi and 200 dpi, etc. Further, it is possible to change image recording densities even more finely by combining the above-described changeover operation with setting of the size of the laser power, the length of light-emitting time, etc.

As has been described above, the image forming apparatus of the present invention, which has a resolution mode changeover means and a means for controlling the light irradiation means, enables a plurality of image recording densities to be obtained in a single system simply by changing the resolution modes from one to another. In addition, since there is no need for a device for changing the revolution rate of the polygonal mirror or for a plurality of light-emitting means, which have been needed in the prior art, the arrangement is simplified, and the cost can be lowered. In addition, there is no fluctuation of the resulting image. Thus, images of high quality can be obtained. Since it is possible to set image recording densities for both the horizontal and vertical scanning directions as desired by the control means, it is possible to obtain subdivided image recording densities in accordance with particular image forming purposes.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. An image forming apparatus for forming a latent electrostatic image on a photosensitive member by irradiation with a light beam, comprising:
    means for scanning said photosensitive member with a light beam emitted from light irradiation means in the horizontal scanning direction;
    light detection means disposed at one side of said photosensitive member to output a horizontal synchronizing signal with a predetermined period when detecting said light beam when the light beam crosses it;
    means for selecting two image clock signals having different periods, for an ordinary resolution mode and a high resolution mode, respectively; and
    means for controlling the operation of said light irradiation means in response to said horizontal synchronizing signal and said image clock signal output from said image clock signal changeover means;
    wherein said image clock signal changeover means sets the period of said image clock signal in said ordinary resolution mode to n (n is a positive integer) times that in said high resolution mode, and said control means judges pulses of said horizontal synchronizing signal to be valid at intervals if (n−1) pulses in said ordinary resolution mode.

2. An image forming apparatus for forming a latent electrostatic image on a photosensitive member, comprising
    a source of a light beam;
    control means for applying image data to said light beam;
    means for scanning said light beam in a predetermined direction across said photosensitive member with a constant period;
    means for producing first and second image clock signals of different period; and
    means for selectively applying said first and second image clock signals to said control means;
    said control means comprising means for synchronizing image data applied to said light beam with the one of said first and second image clock signals that is received thereby without modifying the period of said scanning means,
    further comprising a source of a resolution control signal, said means for selectively applying said first and second image clock signals to said control means comprising means responsive to said resolution control signal for selectively applying said first and second image clock signals to said control means;
    said control means comprising means responsive to said resolution control signal for selectively omitting the application of image data to said light beam during predetermined scannings of said beam.

3. An image forming apparatus for forming a latent electrostatic image on a photosensitive member, comprising:
    a source of a light beam;
    control means for applying image data to said light beam;
    means for scanning said light beam in a predetermined direction across said photosensitive member with a constant period;
    means for producing an image clock signal;
    means for applying said image clock signal to said control means; and
    a source of a resolution control signal;
    said control means comprising means for synchronizing image data applied to said light beam with said image clock signal that is received, and means responsive to said resolution control signal for selectively omitting the application of image data to said light beam during predetermined scannings of said beam.

4. An image forming apparatus for forming a latent electrostatic image on a photosensitive member by irradiation with a light beam comprising:
    a source of a light beam, and control means for modulating said light beam with data;
    means for scanning said photosensitive member at a constant rate with said light beam in a first scanning direction while providing feed of said photosensitive member at a constant rate in a second direction perpendicular to said first direction;
    means for outputting a horizontal synchronizing signal having a predetermined period in response to each scanning of said light irradiation means in the horizontal scanning direction;
    means for selecting two image clock signals having different periods, for an ordinary resolution mode and a high resolution mode, respectively; and
    said control means comprising means for controlling the operation of said light irradiation means in response to said horizontal synchronizing signal and said image clock signal output from said image clock signal changeover means;
    said control means comprising means for selectively determining whether each horizontal synchronizing signal is a valid synchronizing signal as a function of the selected image clock signal, and for directing said light beam, modulated with data, to said photosensitive member only in response to valid synchronizing signals.

* * * * *